United States Patent [19]

Rawlings

[11] 4,070,330
[45] Jan. 24, 1978

[54] HIGH IMPACT MINERAL FILLED POLYCARBONATES

[75] Inventor: Herbert L. Rawlings, New Martinsville, W. Va.

[73] Assignee: Mobay Chemical Corporation, Pittsburgh, Pa.

[21] Appl. No.: 651,756

[22] Filed: Jan. 23, 1976

[51] Int. Cl.² .............................................. C08L 69/00
[52] U.S. Cl. ................................................. 260/37 PC
[58] Field of Search .................................... 260/37 PC

[56] References Cited

U.S. PATENT DOCUMENTS

| | | | |
|---|---|---|---|
| 3,314,920 | 4/1967 | Sakurai et al. | 260/75 P |
| 3,398,212 | 8/1968 | Jackson et al. | 260/45.95 R X |
| 3,740,371 | 6/1973 | Segal | 106/288 B X |
| 3,745,140 | 7/1973 | Segal | 260/40 R |

OTHER PUBLICATIONS

Union Carbide; Silicones Product Information Bulletin; 1965; pp. 1,2.

*Primary Examiner*—Lewis T. Jacobs
*Attorney, Agent, or Firm*—Gene Harsh; Lawrence S. Pope; Frederick H. Colen

[57] ABSTRACT

High impact mineral filled polycarbonates are comprised of a polycarbonate resin of a novaculite mineral filler having an average particle size of less than 5 microns. The percentage of novaculite is based on the total weight of the polycarbonate resin and novaculite. The polycarbonate articles formed from the mineral filled blends exhibit excellent impact properties over typical fillers for polycarbonate resin. Impact properties of the polycarbonate can be further improved by the addition of a silane coupling agent to the polycarbonate novaculite blend.

15 Claims, No Drawings

HIGH IMPACT MINERAL FILLED POLYCARBONATES

BACKGROUND OF THE INVENTION

1. Field of the Invention

This invention relates to polycarbonates and more particularly to mineral filled polycarbonates having high impact properties.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required.

In many instances, it is unnecessary to have the maximum strength imparted by a 100 percent polycarbonate resin article and proposals have been made to reduce the strength of the polycarbonate by adding fillers which also reduce the cost of the final article. The balance of reduced cost with reduced physical properties must be somewhat proportionate since small gains in cost reduction with large decreases in impact strength are undesirable.

Typically, a filler level of 5 to 30 percent by weight of the final molded article is acceptable from a cost standpoint, however, typical fillers such as talc, asbestos and similar fillers demonstrate great reductions in impact strength at these filler levels. This degradation in impact and other physical properties is thought to be attributable to the formation of stress concentrations in the vicinity of the individual filler particles causing propagation of cracks in the molded article.

In accordance with the present invention a mineral filled polycarbonate is provided with improved impact strength over conventionally filled polycarbonates.

SUMMARY OF THE INVENTION

A filled polycarbonate is provided with improved impact strength which is comprised of a polycarbonate resin and novaculite mineral as a filler. The novaculite mineral filler has an average particle size of up to 5 microns. In addition to the polycarbonate resin and novaculite the polycarbonate may also contain a silane coupling agent to further improve impact properties.

DETAILED DESCRIPTION OF THE INVENTION

When used herein "polycarbonate resin" means the neat resin without additives; "Polycarbonate" means both the formulated polycarbonate resin with additives therein and also the final molded plastic product.

The polycarbonate resins useful in practice of the invention are produced by reacting di-(monohydroxyaryl)-alkanes or dihydroxybenzenes and substituted dihydroxybenzenes with derivatives of the carbonic acids such as carbonic acid diesters, phosgene, bis-chloro-carbonic acid esters of di-(monohydroxyaryl)-alkanes and the bis-chloro-carbonic acid esters of the dihydroxybenzenes and the substituted dihydroxybenzenes.

The two aryl residues of the di-(monohydroxyaryl)-alkanes applied according to the invention can be alike or different. The aryl residues can also carry substituents which are not capable of reacting in the conversion into polycarbonates, such as halogen atoms or alkyl groups, for example, the methyl, ethyl, propyl or tert-butyl groups. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4'-dihydroxy-diphenyl)-methane, 2,2'-(4,4'-dihydroxy-diphenyl)-propane, 1,1-(4,4'-dihydroxy-diphenyl)-cyclohexane, 1,1-(4,4'-dihydroxy-3,3'-dimethyl-diphenyl)-cyclohexane, 1,1-(2,2'-dihydroxy-4,4'-dimethyl-diphenyl)-butane, 2,2-(2,2'-dihydroxy-4,4'-di-tert.-butyl-diphenyl)-propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149°–150° C), 3,3-(4,4'-dihydroxy-diphenyl)-pentane, 2,2-(4,4'-dihydroxy-diphenyl)-hexane, 3,3-(4,4'-dihydroxy-diphenyl)-hexane, 2,2-(4,4'-dihydroxy-diphenyl)-4-methylpentane, 2,2-(4,4'-dihydroxy-diphenyl)-heptane, 4,4-(4,4'-dihydroxy-diphenyl)-heptane (melting point 148°–149° C.) or 2,2-(4,4'-dihydroxy-diphenyl)-tri-decane. Suitable di-(monohydroxyaryl)-alkanes, the two aryl residues of which are different are, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxyaryl)-alkanes, the aryl residues of which carry halogen atoms are for instance 2,2-(3,5,3'5'-tetrachloro-4,4'-dihydroxy-diphenyl)-propane, 2,2-(3,5,3'5'tetrabromo-4,4'-dihydroxy-diphenyl)-propane, (3,3'-dichloro-4,4'-dihydroxy-diphenyl)-methane and 2,2'-dihydroxy-5,5'-difluoro-diphenyl-methane. Suitable di-(monohydroxyaryl)-alkanes, the alkyl residue of which, linking the two benzene rings, is substituted by an aryl residue are for instance (4,4'-dihydroxydiphenyl)-phenyl-methane and 1,1-(4,4'-dihydroxy-diphenyl)-1-phenyl-ethane.

Suitable dihydroxybenzenes and substituted dihydroxybenzenes are hydroquinone, resorcinol, pyrocatecol, methyl hydroquinone and the like. Other suitable dihydroxyaromatic compounds are 4,4'-dihydroxy-diphenylene, 2,2'-dihydroxy-diphenylene, dihydroxynapthalene, dihydroxyanthracene and compounds represented by the structural formula:

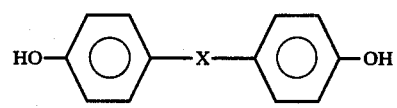

wherein X is S,

In order to obtain special properties, mixtures of various di-(monohydroxyaryl)-alkanes can also be used, thus mixed polycarbonate resins are obtained. By far the most useful polycarbonate resins are those based on 4,4'-dihydroxy-diaryl methanes and more particularly bisphenol A [2,2-(4,4'-dihydroxy-diphenyl)-propane].

Thus when flame retardant characteristics are to be imparted to the basic polycarbonate resin, a mixture of bisphenol A and tetrabromobisphenol A [2,2-(3,5,3'5'-tetrabromo-4,4'dihydroxy-diphenyl)-propane] is utilized when reacting with phosgene or a like carbonic acid derivative.

The polycarbonate resins are those having a weight average molecular weight from 10,000 to 200,000 and preferably a melt flow rate range of 1 to 24 g/10 min (ASTM 1238) and are prepared by methods known to those skilled in the art and more particularly by methods disclosed in U.S. Pat. Nos. 3,028,365, 2,999,846, 3,248,414, 3,153,008, 3,215,668, 3,187,065, 2,964,974, 2,970,137, 2,991,273 and 2,999,835 all incorporated herein by reference.

In some uses, pigments may be added to the polycarbonate to form opaque colored molded products. Predominantly titanium dioxide is used to opacify the polycarbonate to form a white molded product. If a colored product is desired, pigments such as chrome yellows and oranges, and chrome greens may be added to provide various colors to the article. Also oil soluble dyes may be incorporated into the polycarbonate to impart color to the final molded article. In order to color the polycarbonate minimal amounts of colorant i.e. 0.01 to 10g colorant/pound polycarbonate are necessary.

The novaculite mineral filler of the invention comprises 5 to 30 percent by weight of the combined polycarbonate resin and filler composition. The novaculite mineral is sold under the trade name Novacite ® and particularly Novacite L337 and Novacite L207 having an average particle size of less than 5 microns and preferably 3 to 5 microns and particle size distributions of:

|  | Novacite L207 | Novacite L337 |
|---|---|---|
| 100% under | 10μ | 10μ |
| 50% under | 5μ | 5μ |
| 3% under |  | 1μ |
| 2% under | 2μ |  |
| Avg. Particle Size | 4μ | 3.45μ |

In all cases the novaculite has a particle size preferably of less than 10μ. Novaculite is a variety of natural quartz and is distinguished from other silicas. Novacuilte does not include silicas which are amorphous such as silica gel, fumed silica and the like. The amorphous silicas are characterized by a high surface area (50–800m²g) and high solubility in water (100–140 p.p.m.) at room temperature. Further although there are many forms of natural silica such as tridymite, cristobalite, lechatelierite, chalcedony, opal diatomite and the like; these natural crystalline silicas do not provide filling for polycarbonates while maintaining some impact property as well as novaculite.

Novaculite is a unique natural crystalline form of quartz (SiO$_2$) which is found primarily in and around the Devonian-Mississippian deposits of Hot Springs, Arkansas. Petrographic Analysis of Novaculite shows imperfectly developed subhedral crystals having square and rectangular outlines. These anhedral crystals differ from the characteristic crystalline form of quartz which is in the Trigonal Trapexohedral Class of the Rhomobohedral sub-system of the Hexagonal system.

Uniquely novaculite has a minute grain size and individual crystals are usually between about 0.01 to 0.02 millimeter with a maximum of about 0.1 millimeter in size. The index of refraction of novaculite is about 1.550 and it is insoluble in hydrochloric acid. A more extensive description of novaculite is in Dan's System of Minerology by Frondel, Vol. III (1962), Wiley, New York and also in "Petrographic Analysis of Novacite ®/Novaculite" Malvern Minerals Company, 220 Runyon Street, P. O. Box 1246, Hot Springs National Park, Arkansas. Also in U.S. Pat. No. 3,740,371 incorporated herein by reference a further description of Novaculite fillers can be found.

The impact properties of the novaculite filled polycarbonate composition can be further improved by the addition of a silane coupling agent either to the polycarbonate resin or as a pretreatment to the novaculite. The silane coupling agents are characterized by the structural formula:

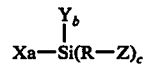

wherein X is a hydrolyzable group, Y is a hydrogen or a monovalent hydrocarbon group, R is a divalent hydrocarbon group having from about 1 to about 20 carbon atoms, Z is a functional group, $a$ is an interger from 1 to 3, $b$ is an interger from 0 to 2, $c$ is an interger from 1 to 3, and the sum $a+b+c$ equals 4. Preferably $a$ is equal to 3, $b$ is equal to 0 and $c$ is equal to 1.

Typical hydrolyzable X groups are halogen and hydroxy groups as well as alkoxy, cycloalkoxy, aryloxy, alkoxy-substituted alkoxy such as B-methoxyethoxy, alkoxycarbonyl, aryloxycarbonyl, alkylcarboxylate, and aryl carboxylate groups, preferably having eight or less carbon atoms. Most preferably X is methoxy or ethoxy. Examples of the Y group are hydrogen, methyl, ethyl, vinyl, isobutyl, phenyl and the like hydrocarbon groups, preferably having 10 or less carbon atoms. The R group can be any divalent hydrocarbon group having up to about 20 carbon atoms or preferably from about 2 to 18 carbon atoms. Typical R groups are ethylene, propylene, butylene, decylene, phenyl and toluyl. In any event the Z group is separated from the Si atom by at least 2 carbon atoms.

The Z functional group is preferably reactive or at least capable of intimate association with the polycarbonate resin. Typical Z groups are amino, epoxy, vinyl, alkyl, methacryloxy and the like, with the preferred Z group being epoxy. Specific examples of coupling agents useful in the practice of the invention are

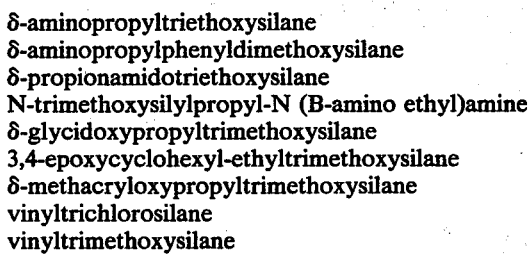

The silane coupling agent is incorporated into polycarbonate at a level of up to 2 percent by weight and preferably up to 1 percent by weight based on the weight of the novaculite. The coupling agent may be incorporated into the polycarbonate by any method which provides homogenity of the polycarbonate resin, coupling agent and novaculite. For example, the polycarbonate resin may be tumble blended with the novaculite and the coupling agent. The tumble blend can then be multiply extruded to insure homogenity of the ingredients. In another method the novaculite can be pretreated with the coupling agent and then blended with the polycarbonate and extruded.

The following examples will further illustrate the invention, however these examples are not intended to limit the invention.

EXAMPLE I

A polycarbonate resin based on bisphenol A and phosgene having a melt flow of at 300° C of 3-6 g/10 min. (ASTM 1238) in granulated form was tumble blended with novaculite having an average particle size of 4 microns and a particle size distribution as follows:

100% under: 10μ
50% under: 5μ
2% under: 2μ

The novaculite was incorporated into the polycarbonate at a level of 20% based on the combined weight of polycarbonate resin and novaculite. The tumble blend was melt extruded into strands, cooled and chopped into pellets for molding. Samples were molded for impact and heat distortion testing. Test results along with the test results of the following examples are reported on Table I.

EXAMPLES II-V

Example I was repeated except conventional fillers were used in place of novaculite. In all cases the fillers used were of a conventional filling grade.

EXAMPLE VI

Example VI is a control having no filler therein.

TABLE I

| Example | Filler | Filler Concn. % | Impact Izod ⅛" ft-lb/in | Heat Distortion Temp. ° C |
|---|---|---|---|---|
| I | Novaculite | 20 | 6.2 | 133 |
| II | Wollastonite | 20 | 1.3 | 138 |
| III | Talc | 10 | 1.7 | 135 |
| IV | TiO$_2$ | 15 | 1.6 | 127 |
| V | Asbestos Chrysotile | 9 | 0.8 | — |
| VI | None | 0 | 12-14 | 133 |

As is illustrated by the foregoing examples novaculite is far superior to other fillers for polycarbonate providing minimal reduction in impact strength.

Thus although the invention has been described with reference to specific materials, the invention is only to be limited so far as is set forth in the accompanying claims.

What is claimed is:

1. In a polycarbonate suitable for forming molded articles comprising a polycarbonate resin and a filler the improvement comprising said filler being a novaculite mineral having an average particle size of up to 5 microns.

2. The polycarbonate of claim 1 wherein said novaculite is present from 5 to 30 percent by weight based on the combined weight of said polycarbonate resin and said novaculite.

3. The polycarbonate of claim 1 wherein said novaculite has a particle size of less than 10 microns.

4. The polycarbonate of claim 2 which includes a silane coupling agent.

5. The polycarbonate of claim 4 wherein said silane coupling agent is present at a level of up to 2 percent by weight based on the weight of said novaculite.

6. The polycarbonate of claim 4 wherein said coupling agent is a glycidoxypropyltrimethoxy silane coupling agent.

7. A polycarbonate comprising:
a polycarbonate resin capable of being molded; and,
a novaculite mineral filler having an average particle size of 3 to 5 microns.

8. The polycarbonate of claim 7 wherein said polycarbonate resin is comprised of the reaction product of bisphenol A and phosgene.

9. The polycarbonate of claim 7 wherein said novaculite is present from 5 to 30 percent based on the combined weight of said polycarbonate and said novaculite.

10. The polycarbonate of claim 7 wherein said novaculite has a particle size of less than 10μ.

11. The polycarbonate of claim 7 which includes a silane coupling agent.

12. The polycarbonate of claim 11 wherein said silane coupling agent is present at a level of up to 2 percent by weight based on the weight of said novaculite.

13. The polycarbonate of claim 12 wherein said coupling agent is a 3,4-epoxycyclohexyl-ethyltrimethoxy silane coupling agent.

14. The polycarbonate of claim 4, wherein said coupling agent is a 3,4-epoxycyclohexyl-ethyltrimethoxy silane coupling agent.

15. The polycarbonate of claim 12, wherein said coupling agent is a glycidoxypropyltrimethoxy silane coupling agent.

* * * * *